United States Patent [19]

Martin

[11] 4,392,457
[45] Jul. 12, 1983

[54] COMBUSTION AND ELECTRIC ENGINE

[76] Inventor: Jesse J. Martin, 4871 Milville-Reily Rd., Hamilton, Ohio 45013

[21] Appl. No.: 221,718

[22] Filed: Dec. 31, 1980

[51] Int. Cl.³ .............................................. F02B 75/00
[52] U.S. Cl. ............................. 123/1 R; 123/DIG. 1; 123/DIG. 7; 60/716; 180/65 A
[58] Field of Search ............ 123/198 F, 1 R, DIG. 1, 123/DIG. 7; 60/698, 716, 720; 180/65 A, 54 C

[56] References Cited

U.S. PATENT DOCUMENTS

| | | | |
|---|---|---|---|
| 1,848,091 | 3/1932 | Winther | 180/65 A |
| 1,886,040 | 11/1932 | Moodyman . | |
| 2,107,844 | 2/1938 | Abbott | 150/65 A |
| 2,338,005 | 12/1943 | Morch . | |
| 3,105,153 | 9/1963 | James, Jr. . | |
| 3,206,609 | 9/1965 | Dawes . | |
| 3,676,719 | 7/1972 | Pecci . | |
| 3,791,473 | 2/1974 | Rosen | 180/65 A |
| 3,861,484 | 1/1975 | Joslin | 180/65 A |
| 3,904,883 | 9/1975 | Horwinski | 180/65 A |
| 4,144,863 | 3/1979 | Abdoo . | |
| 4,185,607 | 1/1980 | Thornburgh . | |
| 4,213,428 | 7/1980 | Bradley | 123/1 R |

Primary Examiner—Ira S. Lazarus
Attorney, Agent, or Firm—Bruce H. Bernstein

[57] ABSTRACT

A combination internal combustion and electric engine has a predetermined plurality of cylinders. A number of cylinders less than the predetermined plurality of cylinders are configured in conventional fashion and each has a conventional fuel powered piston located within it. A solenoid powered piston is positioned in each one of the remaining cylinders which does not have a conventional fuel powered piston therein. Additionally, a method of converting a conventional internal combustion engine having a predetermined plurality of cylinders in fluidic communication with a carburetor and an equal number of pistons into a combination internal combustion and electric engine includes blocking off less than all of the cylinders to prevent fluidic communication between the blocked cylinders and the carburetor and replacing a number of the fuel powered pistons within the blocked cylinders with electrically powered pistons. The invention is equally applicable to four, six, and eight cylinder engines.

13 Claims, 3 Drawing Figures

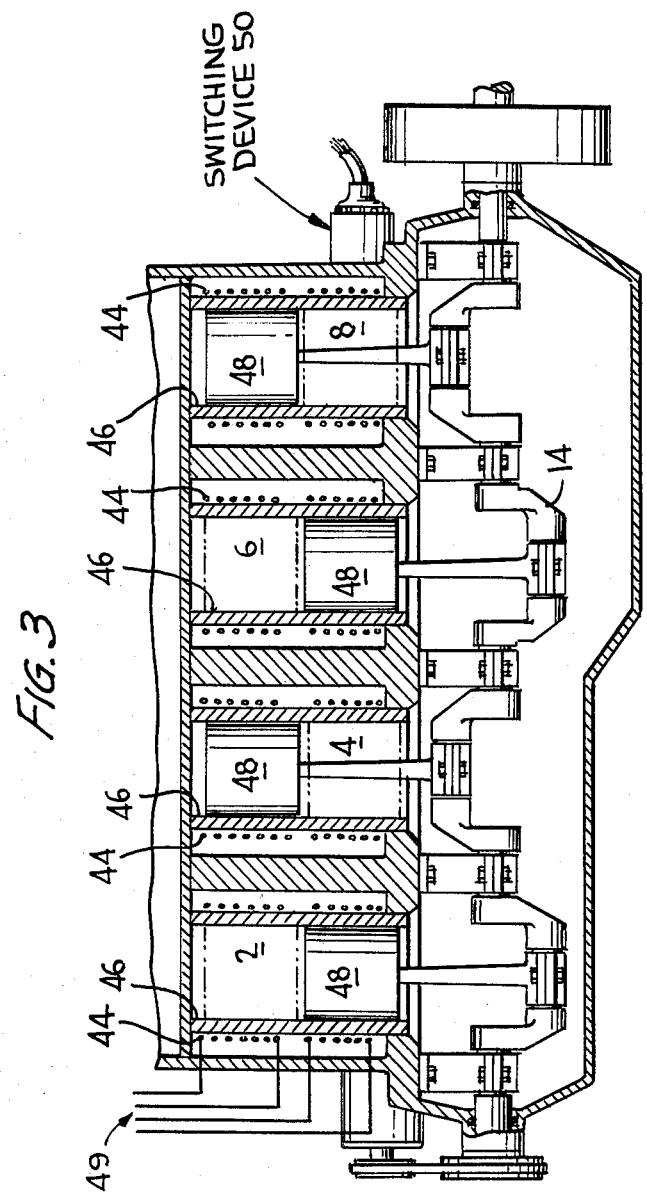

COMBUSTION AND ELECTRIC ENGINE

BACKGROUND OF THE INVENTION

1. Field of the Invention

The present invention generally relates to a combined internal combustion and electric engine and more specifically to an otherwise conventional internal combustion engine in which a plurality of cylinders within the engine are blocked and the pistons contained therein are replaced by solenoid operated pistons.

2. Description of Prior Art

Several prior art patents disclose the operation of an internal combustion engine on less than the full number of cylinders provided. Abdoo, U.S. Pat. No. 4,144,863, discloses an internal combustion engine having a control for preventing combustion in a cylinder or cylinders of a multicylinder engine. This is achieved by preventing the opening of the intake and exhaust valves of a predetermined cylinder or cylinders to be disabled. Thornburgh, U.S. Pat. No. 4,185,607, discloses an eight cylinder engine which can be operated on only four cylinders by disabling four of the cylinders of the engine. A plurality of solenoids are energized to prevent the inlet and exhaust valves for the combustion chambers of the disabled cylinders from opening.

Other prior art patents disclose the operation of an engine by solenoids. Morch, U.S. Pat. No. 2,338,005, discloses an engine operating as an electric engine by the use of solenoids which cause the reciprocation of pistons which in turn drive a crankshaft. A timing shaft is employed to operate the sequence of solenoid activation. Pecci, U.S. Pat. No. 3,676,719, describes a plurality of small pistons which are operable by solenoids which are sequentially activated in order to drive an engine. The distributor for operating the solenoids is of the carbon brush type. James, Jr., U.S. Pat. No. 3,105,153, describes a free piston moveable within a cylinder under the action of fuel. This piston carries a plurality of magnets which will help the piston generate electric current through a plurality of coils. Dawes, U.S. Pat. No. 3,206,609, discloses an internal combustion engine which functions both as an engine and as a generator for alternating current.

Other prior art discloses the conversion of an internal combustion engine into an electrically operated engine by changing all of the pistons within the engine to electric operation. Moodyman, U.S. Pat. No. 1,886,040, discloses an internal combustion engine which has been converted to a solenoid operated engine by the use of a small piston operated by a solenoid and by the removal of the cam shaft and valves. A distributor controls the activation of the solenoid in appropriate sequence in order to operate the engine.

None of the devices disclosed by the prior art, however, disclose the concept of deactivating less than the total number of gas operated pistons in an otherwise conventional internal combustion engine and operating these as deactivated pistons by means of solenoids. In other words, the prior art does not disclose an engine which is a combined electric and internal combustion engine.

SUMMARY OF THE INVENTION

It is a general object of the present invention to provide a new and improved combination internal combustion and electric engine in which a plurality of gas operated pistons in an otherwise conventional internal combustion engine are deactivated and replaced by solenoid actuated pistons.

It is a further object of the present invention to provide a new and improved combination internal combustion and electric engine in which a plurality of solenoid actuated pistons are provided which are activated by a distributor.

It is an additional object of the present invention to provide a new and improved combination internal combustion and electric engine which is more fuel efficient than conventional internal combustion engines.

Yet another object of the present invention is to provide a new and improved method for converting a generally coventional internal combustion engine into a combination internal combustion and electric engine in a relatively simple and inexpensive manner.

Still a further object of the present invention is to provide a new and improved combination internal combustion and electric engine in which a predetermined number of solenoid operated pistons replace conventional fuel operated pistons in cylinders having their inlet manifolds blocked in order to reduce the fuel consumption of the engine.

An additional object of the present invention is to provide a new and improved combination internal combustion and electric engine resulting in increased gas mileage, smooth operation and little pollution.

Upon further study of the specification and appended claims, other objects, features and advantages of the present invention will become more fully apparent to those skilled in the art to which this invention pertains.

Briefly, the above and other objects, features and advantages of the present invention are attained in one aspect thereof by providing a combination internal combustion and electric engine. The engine includes a predetermined plurality of cylinders, a conventional fuel powered piston located in each of a number of the cylinders which is less than the predetermined plurality and an electrically powered piston located in each of the remaining cylinders.

Briefly, the above and other objects, features and advantages of the present invention are attained in second aspect thereof by providing a method of converting a generally conventional internal combustion engine having a predetermined plurality of cylinders in communication with a carburetor and an equal number of fuel powered pistons into a combination internal combustion and electric engine. The method comprises blocking off less than all of said cylinders to prevent fluidic communication between the blocked cylinders and the carburetor and replacing the fuel powered pistons within the blocked cylinders by electrically powered pistons.

BRIEF DESCRIPTION OF THE DRAWINGS

The above and other objects, features and advantages of the present invention will become more fully apparent to those of ordinary skill in the art to which this invention pertains from the following detailed description, when considered in connection with the accompanying drawings, in which like reference characters designate like or corresponding parts throughout the several views, and wherein:

FIG. 3 is a cross-sectional view taken along line 3—3 of FIG. 2.

DETAILED DESCRIPTION OF THE DRAWINGS

Figure 1:
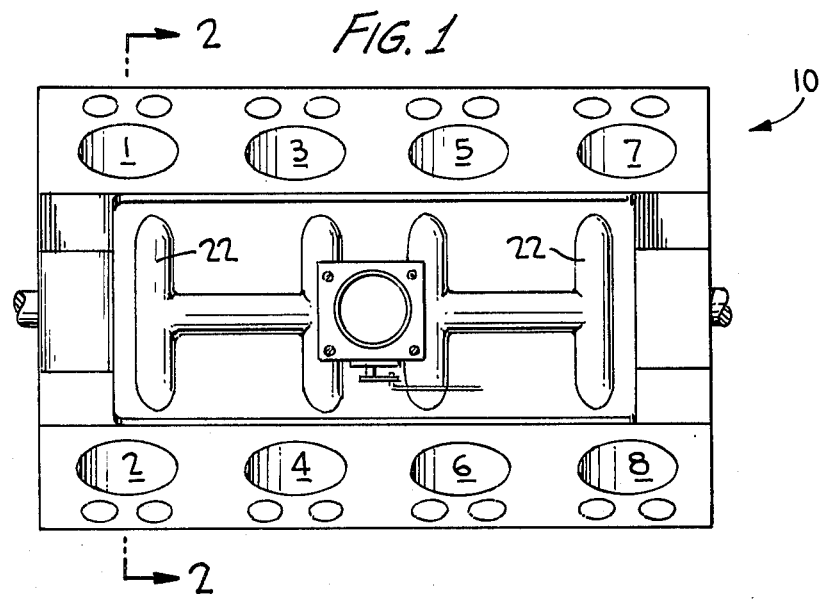
FIG. 1 is a top plan view of an eight cylinder engine indicating one possible arrangement for the cylinders of the engine of the present invention.

Referring now more specifically to FIG. 1, an eight cylinder engine 10 is illustrated which includes a plurality of cylinders 1-8. Carburetor 20 is fluidically connected to the cylinders of the engine by a plurality of manifolds 22. This communication is selectively achieved by operation of valves 30, which are best illustrated in FIG. 2.

One example of the firing order of the cylinders in the engine shown is as follows: 1-8-4-3-6-5-7-2. Other firing orders can be utilized if desired but this one will be referred to herein to provide a consistent frame of reference. As one example, cylinders 2, 3, 5, and 8 may be powered by a solenoid while cylinders 1, 4, 6, and 7 are gas-fired. For purposes of convenience in illustration, however, cylinders 2, 4, 6, and 8 are shown as electrically operated and cylinders 1, 3, 5, and 7 are shown as conventionally fuel-operated or fired.

Although only one battery 40 is shown as being connected in the electric circuit with a switching device 50 and each of the electrically operated cylinders 2, 4, 6 and 8, it is contemplated that four batteries will be provided in a conventional automobile, two which are charging while two are discharging. The automobile distributor can be adapted to activate switching device 50 if desired.

Figure 2:
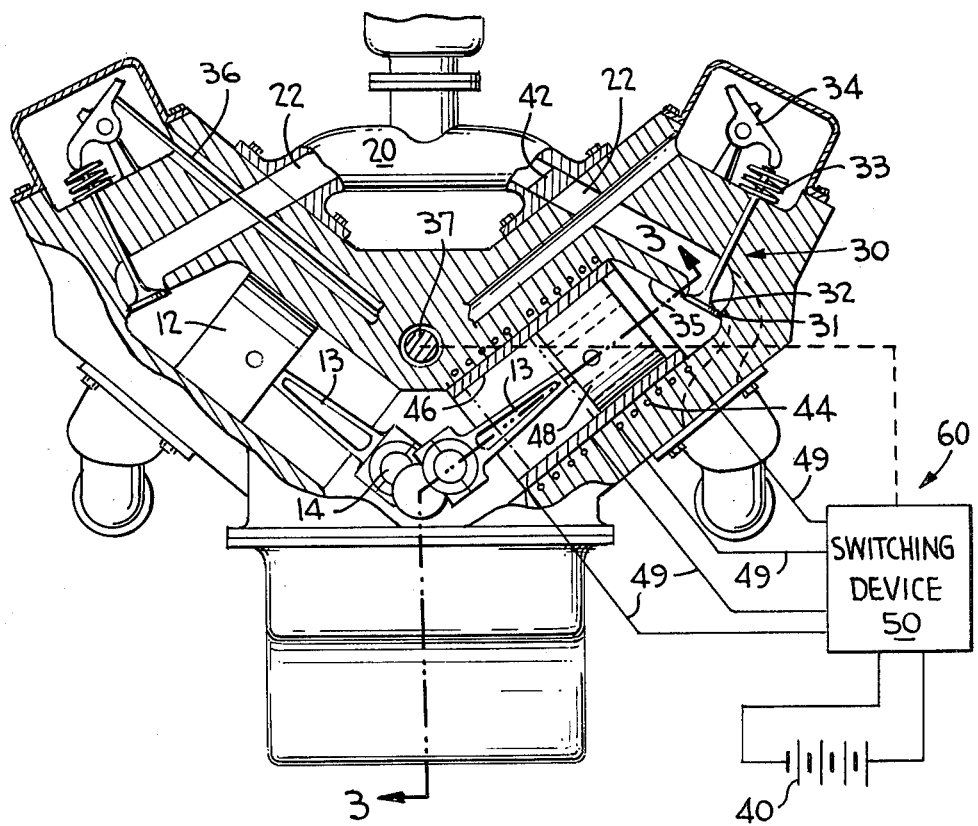
FIG. 2 is a cross-sectional view taken along line 2—2 of FIG. 1.

As illustrated in FIG. 2, engine 10 includes a plurality of cylinders 1 through 8; as illustrated, cylinders 2, 4, 6 and 8 are electrically operable while cylinders 3, 5, and 7 are conventionally fuel powered. Although eight cylinders are shown, the present invention is equally applicable to engines having any number of cylinders, as long as some of the cylinders are conventionally gas-fired and other cylinders are electrically operated.

Conventional pistons 12 are provided within each one of the conventional gas-fired cylinders. Each of these pistons is connected by a connecting rod 13 to crank shaft 14, as best illustrated in FIG. 3. Inlet manifold 22 fluidically connects carburetor 20 to each head 35 which is connected to a temperature sensor (not shown) adjacent output heat exchanger unit 22. Valve seat 31, valve head 32, spring 33 and rocker arm 34. Each rocker arm is connected by a push rod 36 to cam shaft 37.

In a conventional internal combustion engine, all of the cylinders and pistons are configured as described above. In a typical operating cycle having four strokes, each of the four pistons wil provide a power stroke. This means that for any given cycle, where eight cylinders are involved, there will be eight power strokes per cycle in a conventional gasoline powered engine. In a conventional six-cylinder engine there will be six power strokes per cycle and in a conventional four cylinder engine there will be four power strokes per cycle.

In the present invention, a plurality of cylinders, illustrated as half the number of cylinders but which can be any desired number of cylinders less than the total number, are blocked off from fluidic communication with carburetor 20 by elements 42. Accordingly, their respective valves 30 need no longer be operable and they can be de-activated, e.g., by removing a push rod 36 for each of the cylinders involved. While valves 30 remain associated with the cylinders being converted into electrically operated cylinders, there is no reason for them to operate, as no fuel will be used to fire the pistons contained within the converted cylinders. The inlet manifolds 22 for the cylinders 2, 4, 6, and 8 are prevented from fluidically communicating with the carburetor and the cylinders by insertion of blocking elements 42. Pistons 12 are removed and replaced by pistons 48 to convert an otherwise conventional internal combustion engine.

Converting conventional cylinders into cylinders in which electrically operable pistons are used is relatively easy and inexpensive. Solenoid coils 44 are positioned within each one of the cylinders being converted. This inherently reduces the size of the pistons which are to be positioned within the cylinders. In order to reduce the wear between the piston and the solenoid, however, a metallic sleeve 46, e.g., a stainless steel sleeve is positioned between each solenoid coil 44 and a respective electrically operated piston 48 positioned within the cylinder being converted. The sleeve reduces wear caused by the movement of pistons 48. Each piston 48 is connected to crank shaft 14, as were pistons 12. As best illustrated in FIG. 3, connecting rods 13 connect each of the slideable pistons 48 to crank shaft 14. The pistons are relatively smaller than conventional pistons 12 and in one embodiment, a carbon piston having a metallic sleeve surrounding it is utilized. Solenoid coils 44 are connected to switching device 50 via wires 49.

Switching device 50, part of circuit 60, is shown in dashed lines as mechanically connected to cam shaft 37 so as to activate the solenoids in accordance with the firing order of the engine. Alternatively, the automobile distributor could be connected to switching device 50 to activate the appropriate solenoids and thereby operate the pistons in a desired order.

By converting any number less than the total number of cylinders into cylinders having electrically (solenoid) operated pistons, the power output of a conventional internal combustion engine can be increased. Taking the example described previously herein, a conventional eight cylinder engine produces four power strokes per cycle when powered by gasoline. If four of the cylinders are converted, so as to have four electrically or solenoid operated pistons, for each cycle of the engine the four solenoid pistons provide 16 power strokes. This is due to the operation of each solenoid moving a respective piston in a power stroke during what would otherwise be intake, compression, power and exhaust strokes; this results in four power strokes per cycle rather than one. Taken together with the power strokes provided by the four remaining conventionally fired pistons, twenty power strokes per cycle are achieved, in comparison to the eight power strokes when using only conventionally fired pistons. This provides an obvious increase in power.

Such increased power will result in increased gas mileage for automobiles, smoother engine operation, and will permit the use of smaller pistons within the converted cylinder or within any number of cylinders of a new engine which combines both solenoid powered and gasoline-fired pistons. Furthermore, such a combined internal combustion and electrically operated engine will be cleaner and emit less pollution than conventional engines and will be easy to convert and rebuild. The combination engine will be cooled in the same fashion as conventional water cooled engines.

The solenoids are controlled by the cam shaft via switch 50 and the automobile distributor and separate coils for each solenoid operated unit are provided.

Although the present device is expressly designed for use in automobiles, in which it increases power generated by a four cylinder engine in order to produce the work of a six cylinder engine, and increases the work produced by a six and eight cylinder engines in order to approximately produce the work of eight and twelve cylinder engines, it also has other applications, e.g., dynamos for electrical production and other power uses.

From the foregoing description, one skilled in the art can easily ascertain the essential characteristics of this invention, and without departing from the spirit and scope thereof, can make various changes and modifications of this invention to adapt it to various usages and conditions.

What is claimed is:

1. A combination internal combustion and electric engine comprising:
   (a) a predetermined plurality of cylinders;
   (b) a number of said cylinders less than said predetermined plurality comprising conventional fuel powered cylinders and a conventional fuel powered piston located in each of said conventional cylinders; and
   (c) an electrically powered piston located in each of the remaining cylinders.

2. A combination engine in accordance with claim 1 wherein said electrically powered pistons are solenoid powered.

3. A combination engine in accordance with claim 1 wherein a metallic sleeve is positioned within each of said remaining cylinders and a solenoid coil is positioned about each of said sleeves.

4. A combination engine in accordance with claim 3 wherein said electrically powered pistons comprise carbon pistons.

5. A combination engine in accordance with claim 3 wherein each of said solenoids is activated by a switching device connected to a cam shaft.

6. A combination engine in accordance with claim 3 wherein each of said cylinders is connected to a carburetor by an inlet manifold and the inlet manifolds leading to said remaining cylinders have blocking elements positioned therein which are adapted to prevent fluidic communication between said carburetor and said remaining cylinders.

7. A combination engine in accordance with claim 6 further comprising selectively operated valves which allow fluidic communication between said conventional cylinders and said carburetor.

8. A combination engine in accordance with claim 3 wherein all of said fuel powered pistons and said electrically powered pistons are connected to a crank shaft.

9. A combination engine in accordance with claim 8 wherein a valve is positioned adjacent to each of said remaining cylinders, said valves being inoperable.

10. A method of converting a conventional internal combustion engine having a predetermined plurality of cylinders in fluidic communication with a carburetor and an equal number of fuel powered pistons positioned within said cylinders into a combination internal combustion and electric engine, said method comprising blocking off less than all of said predetermined plurality of cylinders to prevent fluid communication between said blocked cylinders and said carburetor and replacing the fuel powered pistons located within the blocked cylinders with electrically powered pistons.

11. A method in acordance with claim 10 wherein said fuel powered pistons comprise solenoid powered pistons.

12. A method in accordance with claim 10 further comprising both the fuel powered pistons and the electrically powered pistons to a crankshaft.

13. A combination internal combustion and electric engine comprising a predetermined plurality of cylinders, a number of said cylinders less than said predetermined plurality comprising conventional fuel powered cylinders, a conventional fuel powered piston being located in each of said conventional cylinders, an electrically powered piston being located in each of the other of said predetermined cylinders, a metallic sleeve being positioned within each of said other cylinders and a solenoid coil being positioned about each of said sleeves, all of said predetermined plurality of cylinders being connected to a carburetor by an inlet manifold, said inlet manifold leading to said other cylinders including blocking elements positioned therein, said blocking elements comprising means for preventing fluidic communication between said carburetor and said other cylinders.

* * * * *